US012583954B2

(12) United States Patent
Shikata

(10) Patent No.: US 12,583,954 B2
(45) Date of Patent: Mar. 24, 2026

(54) POLYETHYLENE POWDER AND MOLDED ARTICLE

(71) Applicant: Asahi Kasei Kabushiki Kaisha, Tokyo (JP)

(72) Inventor: Kazuya Shikata, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 487 days.

(21) Appl. No.: 18/121,964

(22) Filed: Mar. 15, 2023

(65) Prior Publication Data

US 2023/0322980 A1     Oct. 12, 2023

(30) Foreign Application Priority Data

Mar. 17, 2022     (JP) ................................. 2022-042424

(51) Int. Cl.
C08F 110/02          (2006.01)
C08L 23/06           (2006.01)
(52) U.S. Cl.
CPC ................................. C08F 110/02 (2013.01)
(58) Field of Classification Search
CPC .............................. C08F 110/02; C08L 23/06
See application file for complete search history.

(56) References Cited

U.S. PATENT DOCUMENTS

| | | |
|---|---|---|
| 10,041,191 B1 | 8/2018 | Tarutani |
| 11,053,609 B2 | 7/2021 | Ou et al. |

| | | | |
|---|---|---|---|
| 2011/0217537 A1 | 9/2011 | Fantinel et al. |
| 2021/0380730 A1 | 12/2021 | Kang et al. |
| 2022/0144981 A1 | 5/2022 | Hamada |
| 2022/0235492 A1 | 7/2022 | Furuta et al. |
| 2022/0294076 A1 | 9/2022 | Zhang et al. |

FOREIGN PATENT DOCUMENTS

| | | |
|---|---|---|
| EP | 4130063 A1 | 2/2023 |
| JP | 2014-118515 A | 6/2014 |
| JP | 2015-120784 A | 7/2015 |
| JP | 6686092 B2 | 4/2020 |
| WO | 2020/171017 A1 | 8/2020 |
| WO | 2020/230809 A1 | 11/2020 |
| WO | 2021/193422 A1 | 9/2021 |
| WO | 2021/193544 A1 | 9/2021 |
| WO | 2021/210590 A1 | 10/2021 |

OTHER PUBLICATIONS

European Search Report issued in counterpart European Patent Application No. 23162468.5 dated Sep. 18, 2023.

*Primary Examiner* — Catherine S Branch
(74) *Attorney, Agent, or Firm* — Morgan, Lewis & Bockius LLP

(57)          ABSTRACT

Provided is a polyethylene powder that completes swelling in a short time, offers a uniform appearance or shape of a molded article, and produces a molded article with smooth surface even by high-speed molding.

The polyethylene powder satisfies (requirements 1 and 2). (Requirement 1): an intrinsic viscosity (IV) is 1.5 dL/g or more and 34.0 dL/g or less, and (requirement 2): a ratio $\gamma_0/\gamma_1$ of an elastic limit strain $\gamma_0$ at a swelling time t (h) of 0 hours to an elastic limit strain $\gamma_1$ at a swelling time t (h) of 1 hour is 0.80 or more and 0.95 or less, wherein the ratio is obtained from a strain dependence test.

12 Claims, 1 Drawing Sheet

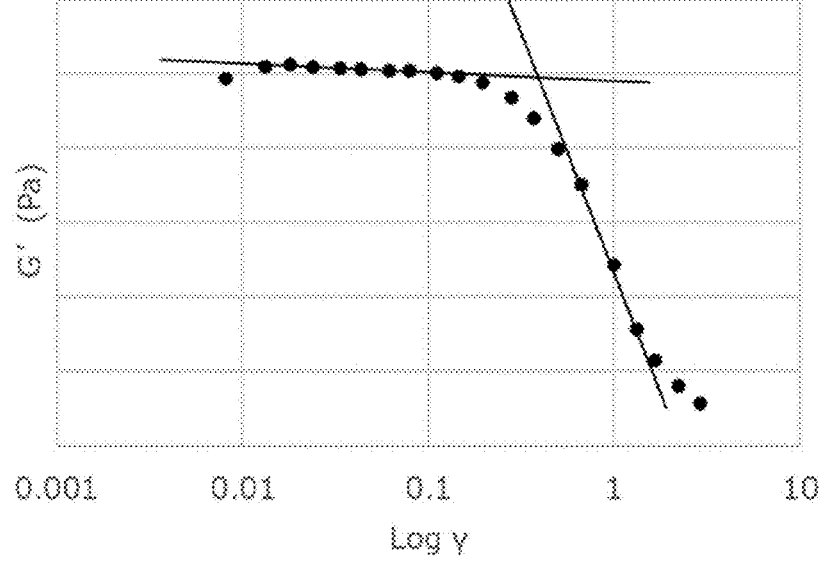

POLYETHYLENE POWDER AND MOLDED ARTICLE

TECHNICAL FIELD

The present invention relates to a polyethylene powder and a molded article.

RELATED ART

Polyethylene is easy to melt-process, and a molded article of polyethylene has high mechanical strength and is also excellent in chemical resistance, rigidity, and the like. Hence, polyethylene has heretofore been used as a material for a wide variety of purposes such as films, sheets, microporous membranes, fiber, foams, and pipes.

Particularly, ultra-high molecular weight polyethylene has high practical applicability because it has higher mechanical strength and is excellent in slidability and abrasion resistance and also excellent in chemical stability and long-term reliability.

However, an ultra-high molecular weight polyethylene powder has extremely low fluidity even if melted at a temperature equal to or higher than a melting point, and therefore, is disadvantageously difficult to process by a general approach. Hence, a wet process involving dissolving the ultra-high molecular weight polyethylene powder in a solvent, and processing the ultra-high molecular weight polyethylene in this dissolved state, followed by the removal of the solvent is known as a method for molding the ultra-high molecular weight polyethylene.

For example, Patent Literature 1 discloses a method including adding a solvent to a polyethylene powder to prepare slurry, heat-melting the slurry in an extruder to prepare a gel, and processing the gel into a film by cast molding and drawing, followed by the removal of the solvent by extraction, thereby obtaining a microporous membrane.

For example, Patent Literature 2 discloses a method including adding a solvent to a polyethylene powder to prepare slurry, heat-melting the slurry in an extruder to prepare a gel, and processing the gel into a thread by spinning and drawing, followed by the removal of the solvent by extraction, thereby obtaining high-strength fiber.

As disclosed in these literatures, the wet process involves the step of adding a solvent to a polyethylene powder to prepare slurry. The polyethylene powder in the state of slurry contains the solvent and thus swells. The state or degree of swelling of the polyethylene powder is known to largely influence the processability of the polyethylene powder and the physical properties of its molded article (see, for example, Patent Literature 3 and 4).

CITATION LIST

Patent Literature

[Patent Literature 1] International Publication No. WO 2021/210590

[Patent Literature 2] International Publication No. WO 2020/230809

[Patent Literature 3] International Publication No. WO 2021/193422

[Patent Literature 4] Japanese Patent No. 6686092

SUMMARY OF INVENTION

Technical Problem

The polyethylene powder is usually required to swell sufficiently for improving the quality of a molded article of the polyethylene powder to be obtained by the wet process mentioned above. If the swelling is insufficient, polyethylene may not be uniformly dissolved or dispersed in slurry. This tends to cause problems such as the breaking of the molded article in a drawing step, a non-uniform appearance or shape of the molded article, poor mechanical performance of the molded article, non-uniform shrinkage of the molded article during solvent extraction, and poor surface smoothness of the molded article by high-speed molding. Although these problems may be alleviated by extending the time of the step of swelling the polyethylene powder in a solvent, such an extended time of the swelling step causes another problem of the deterioration of productivity of the polyethylene powder or its molded article. Furthermore, even the extended time of the swelling step may not solve various problems as mentioned above. Thus, it is desired to improve the swelling performance of the polyethylene powder as characteristics of a starting material for a molded article.

Accordingly, in light of the problems mentioned above, an object of the present invention is to provide a polyethylene powder that completes swelling in a short time, offers a uniform appearance or shape of a molded article, and produces a molded article with smooth surface even by high-speed molding.

Solution to Problem

The present inventors have pursued diligent studies to solve the problems of the conventional techniques mentioned above, and as a result, have found that a polyethylene powder having a ratio between the elastic limit strain before swelling and that after swelling within a predetermined range as determined by predetermined Conditions for measurement of viscoelasticity of slurry can solve the problems mentioned above, consequently completing the present invention.

Specifically, the present invention is as follows.

[1]

A polyethylene powder satisfying the following (requirement 1) and (requirement 2):

(requirement 1): an intrinsic viscosity (IV) measured in accordance with IS01628-3 (2010) is 1.5 dL/g or more and 34.0 dL/g or less, and (requirement 2): a ratio $\gamma_0/\gamma_1$ of an elastic limit strain $\gamma_0$ at a swelling time t (h) of 0 hours to an elastic limit strain $\gamma_1$ at a swelling time t (h) of 1 hour is 0.80 or more and 0.95 or less, wherein the ratio is obtained from a strain dependence test for dynamic viscoelasticity under the following <Conditions for measurement of viscoelasticity of slurry> and the swelling time t (h) is as defined below:

<Conditions for Measurement of Viscoelasticity of Slurry>

Measurement apparatus: MARSIII manufactured by Thermo Fisher Scientific, Inc.

Stage: 20 mm$\phi$

Plate: 20 mm$\phi$ parallel plate

Gap: 0.5 mm

Slurry composition: 30 parts by mass of the polyethylene powder and 70 parts by mass of liquid paraffin Conditions for measurement: the strain dependence test is conducted by the following steps 1 and 2:

step 1 of keeping a temperature of a slurry at 100° C. for the swelling time t (h) in a nitrogen atmosphere on a sample stage; and step 2 of conducting the strain dependence test under conditions of 180° C. and a frequency of 1 Hz in a nitrogen atmosphere, Determination of elastic limit strain: an elastic limit strain $\gamma_t$ is determined by a two-tangent method.

[2]

The polyethylene powder according to [1], wherein the elastic limit strain $\gamma_1$ at the swelling time t (h) of 1 hour obtained from the strain dependence test for dynamic viscoelasticity under the <Conditions for measurement of viscoelasticity of slurry> is 0.10 or more.

[3]

The polyethylene powder according to [1] or [2], wherein the polyethylene powder has at least one peak within a range from 10 μm to 80 μm in a pore size distribution measured with a mercury porosimeter.

[4]

The polyethylene powder according to any one of [1] to [3], wherein the polyethylene powder is an ethylene homopolymer.

[5]

The polyethylene powder according to any one of [1] to [4], wherein an isothermal crystallization time at 125° C. is 7.0 minutes or shorter, as determined by measurement of isothermal crystallization time using DSC under the following <Conditions for measurement of isothermal crystallization time>:

<Conditions for Measurement of Isothermal Crystallization time> step 1: retaining the polyethylene powder at 50° C. for 1 minute, followed by heating to 180° C. at a heating rate of 10° C./min;

step 2: retaining the polyethylene powder at 180° C. for 5 minutes, followed by cooling to 125° C. at a cooling rate of 80° C./min; and step 3: retaining the polyethylene powder at 125° C., wherein a time when a temperature reaches 125° C. is defined as the point of origin (0 min), and a time when an exothermic peak top assigned to crystallization is exhibited is regarded as the isothermal crystallization time.

[6]

The polyethylene powder according to any one of [1] to [5], wherein an apparent density is 0.30 g/mL or larger.

[7]

The polyethylene powder according to any one of [1] to [6], wherein a particle size $D_{50}$ determined by a dry sieving method is 150 μm or smaller.

[8]

The polyethylene powder according to any one of [1] to [7], wherein a lamellar thickness is 30 nm or smaller.

[9]

A molded article of a polyethylene powder according to any one of [1] to [8].

[10]

The molded article according to [9], wherein the molded article is a separator for secondary batteries.

[11]

The molded article according to [9], wherein the molded article is a separator for lithium ion secondary batteries.

[12]

The molded article according to [9], wherein the molded article is fiber.

Advantageous Effects of Invention

The present invention can provide a polyethylene powder that completes swelling in a short time, offers a uniform appearance or shape of a molded article, and produces a molded article with smooth surface even by high-speed molding.

BRIEF DESCRIPTION OF THE DRAWING

FIG. 1 shows one example of measurement results of a strain dependence test.

DETAILED DESCRIPTION OF THE PREFERRED EMBODIMENTS

Hereinafter, the mode for carrying out the present invention (hereinafter, also referred to as the "present embodiment") will be described in detail.

The present embodiment given below is an illustration for describing the present invention and does not intend to limit the present invention to the contents given below. The present invention can be carried out through various changes or modifications without departing from the spirit of the present invention.

[Polyethylene Powder]

The polyethylene powder of the present embodiment satisfies the following (requirement 1) and (requirement 2):

(requirement 1): an intrinsic viscosity (IV) measured in accordance with IS01628-3 (2010) is 1.5 dL/g or more and 34.0 dL/g or less, and (requirement 2): a ratio $\gamma_0/\gamma_1$ of an elastic limit strain at a swelling time t (h) of 0 hours, "$\gamma_0$", to an elastic limit strain at a swelling time t (h) of 1 hour, "$\gamma_1$", is 0.80 or more and 0.95 or less, wherein the ratio is obtained from a strain dependence test for dynamic viscoelasticity under the following <Conditions for measurement of viscoelasticity of slurry> and the swelling time t (h) is as defined below:

<Conditions for Measurement of Viscoelasticity of Slurry>

Measurement apparatus: MARSIII manufactured by Thermo Fisher Scientific, Inc.

Stage: 20 mmϕ

Plate: 20 mmϕ parallel plate

Gap: 0.5 mm

Slurry composition: 30 parts by mass of the polyethylene powder and 70 parts by mass of liquid paraffin Conditions for measurement: the strain dependence test is conducted by the following steps 1 and 2:

step 1 of keeping a temperature of a slurry at 100° C. for the swelling time t (h) in a nitrogen atmosphere on a sample stage; and step 2 of conducting the strain dependence test under conditions of 180° C. and a frequency of 1 Hz in a nitrogen atmosphere, Determination of elastic limit strain: an elastic limit strain $\gamma_t$ is determined by a two-tangent method.

The polyethylene powder of the present embodiment, which has technical features as described above, exerts the effects of obtaining a polyethylene powder which can complete swelling in a short time, offer a uniform appearance or shape of a molded article, and produce a molded article with smooth surface even by high-speed molding.

Hereinafter, the technical features of the polyethylene powder of the present embodiment will be described.

(Polyethylene)

The polyethylene powder of the present embodiment is made of an ethylene polymer.

In the ethylene polymer, an ethylene unit preferably accounts for 99.5 mol % or more, more preferably 99.8 mol % or more, further preferably 100 mol % (i.e., an ethylene homopolymer), of constituent units.

The ethylene polymer for the polyethylene powder of the present embodiment may be a copolymer with a branch introduced by the addition of a copolymerizable component such as α-olefin in a very small amount, for the purpose of improving processability or improving the creep characteristics of fiber produced as a molded article of the polyethylene powder.

When the copolymerizable component, such as α-olefin, other than the ethylene unit accounts for 0.5 mol % or less of constituent units of the ethylene polymer for the polyethylene powder of the present embodiment, reduction in the degree of molecular orientation of a molded article after drawing due to a branched chain is suppressed so that mechanical strength is enhanced.

Examples of the copolymerizable component when the ethylene polymer is a copolymer include, but are not particularly limited to, α-olefin and vinyl compounds.

Examples of the α-olefin include, but are not limited to, α-olefin having 3 to 20 carbon atoms and specifically include propylene, 1-butene, 4-methyl-1-pentene, 1-hexene, 1-octene, 1-nonene, 1-decene, 1-undecene, 1-dodecene, 1-tridecene, and 1-tetradecene.

Examples of the vinyl compound include, but are not limited to, vinylcyclohexane, styrene and derivatives thereof.

If necessary, non-conjugated polyene such as 1,5-hexadiene or 1,7-octadiene may be used as another comonomer.

One of these copolymerizable components may be used singly, or two or more thereof may be used in combination.

When the ethylene polymer for the polyethylene powder of the present embodiment is a copolymer, the amount of another comonomer in the copolymer can be determined by NMR or the like The polyethylene powder of the present embodiment may be a blend of polyethylenes different in viscosity-average molecular weight, molecular weight distribution, or the like. Low-density polyethylene, linear low-density polyethylene, or an additional resin such as polypropylene or polystyrene may be blended therewith.

The polyethylene powder of the present embodiment may be a polymer produced in a single polymerization vessel or may be a multistage polymer produced in a multistage polymerization apparatus.

Moreover, the polyethylene powder of the present embodiment can also be processed into pellets as well as powder, and such pellets are also favorably used.

(Particle Size $D_{50}$ of Polyethylene Powder)

The $D_{50}$ of the polyethylene powder of the present embodiment is preferably 150 μm or smaller, more preferably 120 μm or smaller, further preferably 100 μm or smaller. The $D_{50}$ of the polyethylene powder is preferably 5 μm or larger, more preferably 10 μm or larger.

The polyethylene powder having $D_{50}$ of 150 μm or smaller has better solubility in a solvent and can reduce an undissolved residue, which impairs the performance or appearance of a processed product. The polyethylene powder having $D_{50}$ of 5 μm or larger tends to have better handleability because it is prevented from flying, and also tends to more easily form homogeneous slurry because it is prevented from forming lumps when added to a solvent.

The $D_{50}$ of the polyethylene powder described herein is a particle size at which the cumulative weight is 50%, i.e., a median size, and is a value determined by a dry sieving method.

The $D_{50}$ of the polyethylene powder of the present embodiment can be controlled in the above numerical range by classification through a sieve having a predetermined opening. The $D_{50}$ of the polyethylene powder can also be controlled in the above numerical range by appropriately adjusting conditions (temperature, ethylene pressure, etc.) in a polymerization system. Specifically, the $D_{50}$ can be increased by elevating a polymerization temperature and/or a polymerization pressure, and the average particle size $D_{50}$ can be decreased by lowering a polymerization temperature and/or a polymerization pressure.

(Density of Polyethylene Powder)

The density of the polyethylene powder of the present embodiment is not particularly limited and is preferably 910 kg/m$^3$ or larger and 980 kg/m$^3$ or smaller, more preferably 915 kg/m$^3$ or larger and 970 kg/m$^3$ or smaller, further preferably 920 kg/m$^3$ or larger and 965 kg/m$^3$ or smaller.

The density of the polyethylene powder refers to the true density of the polymer.

When the density of the polyethylene powder of the present embodiment is 910 kg/m$^3$ or larger and 980 kg/m$^3$ or smaller, a drawn molded article, a microporous membrane, and fiber containing the polyethylene powder of the present embodiment has excellent strength.

(Intrinsic Viscosity (IV))

The intrinsic viscosity (IV) of the polyethylene powder of the present embodiment is 1.5 dL/g or more and 34.0 dL/g or less, preferably 6.0 dL/g or more and 29.0 dL/g or less, more preferably 14.0 dL/g or more and 24.0 or less.

The intrinsic viscosity (IV) within the above range tends to improve molding processability and to enhance the mechanical strength of a molded product.

The intrinsic viscosity (IV) can be controlled in the above numerical range by appropriately adjusting polymerization conditions or the like using a catalyst mentioned later. Specifically, the intrinsic viscosity (IV) can be controlled, for example, by allowing hydrogen to exist in a polymerization system, and/or adjusting a polymerization temperature.

The intrinsic viscosity (IV) of the polyethylene powder can be measured by a method described in Examples mentioned later.

(Elastic Limit Strain $\gamma_1$)

When a slurry solution containing 30 parts by mass of the polyethylene powder of the present embodiment and 70 parts by mass of liquid paraffin is prepared and subjected to a strain dependence test under <Conditions for measurement of viscoelasticity of slurry> as described above, wherein the swelling time t (h) is set to 1 hour, a curve as shown in FIG. 1 (hereinafter, referred to as a strain dependence curve) is obtained, for example.

In FIG. 1, the abscissa depicts a strain given to a sample in a viscoelasticity test, and the ordinate depicts a storage modulus (G') obtained in the viscoelasticity test. As shown in FIG. 1, tangents are draw on linear and non-linear regions, respectively, and the elastic limit strain can be determined form the point of intersection therebetween.

When the strain given to a sample gets larger beyond the linear elastic region, the storage modulus starts to decrease because the internal structure of the sample is broken, and this strain is regarded as an elastic limit strain γ1.

The swelling time t (h) of 1 hour under <Conditions for measurement of viscoelasticity of slurry> as described above simulates a swollen state of the polyethylene powder in a solvent in the molding processing of the polyethylene powder by a wet process, and viscoelasticity in such a wet process can be thus evaluated.

The elastic limit strain $\gamma_1$ of the polyethylene powder of the present embodiment is preferably 0.10 or more, more preferably 0.15 or more, further preferably 0.20 or more.

The polyethylene powder having an elastic limit strain $\gamma_1$ of 0.10 or more tends to have high productivity without reducing the surface smoothness of a molded article or without breaking the molded article, even by drawing at a high strain rate in the molding processing of the polyethylene powder by a wet process.

Examples of the method for controlling the elastic limit strain $\gamma_1$ of the polyethylene powder in the predetermined range include, but are not particularly limited to, adjusting the intrinsic viscosity (IV) of the polyethylene powder. The elastic limit strain $\gamma_1$ tends to be increased by lowering the intrinsic viscosity (IV) because the molecules of the polyethylene powder move easily. The intrinsic viscosity (IV) can be measured by a method described in Examples mentioned later. The intrinsic viscosity (IV) can be controlled by adjusting polymerization conditions such as the abundance of hydrogen in a polymerization system, a polymerization temperature, and a polymerization time.

(Elastic Limit Strain Ratio $\gamma_0/\gamma_1$)

The elastic limit strain $\gamma_0$ is an elastic limit strain obtained by conducting a strain dependence test at a swelling time t (h) of 0 hours under <Conditions for measurement of viscoelasticity of slurry> as described above.

On the other hand, the elastic limit strain $\gamma_1$ is an elastic limit strain obtained at a swelling time t (h) of 1 hour under <Conditions for measurement of viscoelasticity of slurry> as described above.

The polyethylene molecules of the polyethylene powder are detangled by swelling in a solvent, while complicatedly entangled in the state of a powder. A gel of a sufficiently swollen polyethylene powder is insusceptible to structural disorder even if given a large strain, because of the absence of local bias of a viscosity, and thus has a large value of the elastic limit strain. Thus, the difference between the states before and after swelling can be evaluated, and accordingly, the elastic limit strain ratio $\gamma_0/\gamma_1$ serves as an index for easy swelling of the polyethylene powder.

For example, $\gamma_0/\gamma_1$ as sufficiently large as 0.8 indicates an elastic limit strain equivalent to that of a sufficiently swollen polyethylene powder even at a swelling time of 0 hours, and therefore means that swelling proceeds sufficiently fast and that the polyethylene molecules are detangled to some extent in the state of the polyethylene powder.

The elastic limit strain ratio, $\gamma_0/\gamma_1$, of the polyethylene powder of the present embodiment is 0.80 or more and 0.95 or less, preferably 0.82 or more and less than 0.92, more preferably 0.85 or more and less than 0.90.

$\gamma_0/\gamma_1$ of 0.80 or more is preferred for the following reason: swelling proceeds sufficiently fast and the polyethylene molecules are detangled to some extent in the state of the polyethylene powder; thus, the polyethylene powder completes swelling in a short time and offers a uniform appearance or shape of a molded article; and also, the frequency of breaking of a molded article in a drawing step tends to be reduced.

$\gamma_0/\gamma_1$ of 0.95 or less is preferred because the polyethylene powder is suitable for performing wet molding. This is because preliminary swelling is ineffective for polyethylene having extremely large molecular entanglement or polyethylene having an extremely large molecular weight, which may exhibit $\gamma_0/\gamma_1$ on the order of 1.0.

The method for controlling the elastic limit strain ratio, $\gamma_0/\gamma_1$, in the predetermined range is not particularly limited and may include, for example, facilitating the penetration of a solvent into voids between particles of the polyethylene powder or facilitating the penetration of a solvent into the inside of the polyethylene powder, to secure a long substantial swelling time when the polyethylene powder comes into contact with a solvent. Another possible method may include, for example, facilitating the penetration of a solvent molecule into the inside of polyethylene crystals to shorten time required for swelling.

Examples of the approach to facilitating the penetration of a solvent into voids between particles of the polyethylene powder include, but are not particularly limited to, adjusting the gaps between the particles of the polyethylene powder to a proper distance. Too narrow gaps between the particles require a solvent to take a long time for penetration due to a high viscosity. On the other hand, too wide gaps between the particles weaken the capillary force of a solvent for penetration and still require the solvent to take a long time for penetration. Examples of the method for adjusting the gaps between the particles to a proper distance include narrowing the particle size distribution of the polyethylene powder. This is achieved by removing coarse and fine powders of the polyethylene powder, or by performing polymerization for polyethylene using a polymerization catalyst having a narrow particle size distribution.

The approach to facilitating the penetration of a solvent into the inside of the polyethylene powder is not particularly limited. For example, catalytic activity is set to 6000 (g-PE/g-catalyst) or more in polymerization for the polyethylene powder so that the polyethylene powder surface is chapped to facilitate the penetration of a solvent into the inside of the polyethylene powder. The catalytic activity can be controlled by adjusting a polymerization pressure, a polymerization residence time, or the like. In the case of multistage polymerization, catalytic activity at least in a final polymerization tank is set to 6000 (g-PE/g-catalyst) or more in polymerization for the polyethylene powder so that the polyethylene powder surface is chapped to facilitate the penetration of a solvent into the inside of the polyethylene powder.

The approach to facilitating the penetration of a solvent molecule into the inside of polyethylene crystals is not particularly limited and may be, for example, (1) decreasing a crystallinity, (2) reducing molecular entanglement, or (3) decreasing the number of tie molecules.

The methods (1) to (3) are independent methods and do not have to be carried out at the same time. Hereinafter, the methods (1) to (3) will be described.

Since a solvent penetrates into an amorphous moiety of polyethylene crystals, the time required for swelling is shortened by increasing the ratio of the amorphous moiety, i.e., decreasing a crystallinity. The method (1) of decreasing a crystallinity may include introducing a comonomer for copolymerization. It is preferred to introduce a comonomer only at the first half of multistage polymerization, in order not to impair the mechanical strength of a molded article. The amount of the comonomer introduced into a polymerization tank is preferably 0.4 mol % or more, for obtaining the effect of facilitating the penetration of a solvent molecule into the inside of polyethylene crystals.

Since polyethylene molecules in the amorphous moiety are complicatedly entangled so as to constrain each other, this inhibits the penetration of a solvent molecule. Specifically, the time required for swelling is shortened by reducing molecular entanglement. The method (2) of reducing molecular entanglement may include, for example, preparing a catalyst at a low temperature over a long time and carrying out polymerization for polyethylene using the catalyst. Specifically, a supported Ziegler-Natta catalyst component [B] described in Examples mentioned later is effectively used.

Tie molecules that connect crystals exist in the amorphous moiety, and the amorphous moiety cannot freely increase a volume if the distances between the crystals are restricted by the tie molecules. This inhibits the penetration of a solvent molecule. Specifically, the time required for swelling is shortened by decreasing the number of tie molecules. According to the report (Hosoda et al., (2014) Japanese Journal of Polymer Science and Technology, Vol. 71, p. 483), the number of tie molecules is increased as a lamellar thickness is more uniform and as a crystallinity is closer to 50%. In other words, the number of tie molecules is decreased as a lamellar thickness is more non-uniform and as a crystallinity is higher. Specific examples of the method for rendering the lamellar thickness non-uniform and elevating the crystallinity in the method (3) include, but are not particularly limited to, a method including mixing a very small amount of a comonomer into ethylene, performing polymerization so that lamellar crystals consisting of homopolyethylene alone coexist with lamellar crystals containing a copolymer, whereby the lamellar thickness is rendered uneven, and carrying out a drying step in a polyethylene production process under high-temperature conditions to obtain a high crystallinity. The amount of the comonomer introduced for decreasing the number of tie molecules is preferably on the order of 0.01 mol % to 0.05 mol %. The comonomer in a trace amount on the order of 0.01 mol % to 0.05 mol % has only ignorable influence on the physical properties, such as a melting point or mechanical strength, of polyethylene. Since the amount of the comonomer introduced in polyethylene is undetectable by NMR, such polyethylene can be substantially regarded as an ethylene homopolymer.

The drying temperature for elevating a crystallinity is preferably on the order of 80° C. to 110° C.

(Peak in Pore Size Distribution)

For the pore size distribution, the polyethylene powder of the present embodiment preferably has at least one peak within a range from 10 μm to 80 μm, more preferably has at least one peak within a range from 15 μm to 70 μm, and further preferably has at least one peak within a range from 20 μm to 60 μm, in a pore size distribution measured with a mercury porosimeter.

Having at least one peak within the above range means having voids having a size within the above range between particles of the polyethylene powder, i.e., in the polyethylene powder as an ensemble. The presence of such voids is preferred because a solvent penetrates easily into the voids between particles of the polyethylene powder and swelling progresses rapidly.

Examples of the method for allowing the polyethylene powder to preferably have at least one peak within a range from 10 μm to 80 μm in a pore size distribution measured with a mercury porosimeter include narrowing the particle size distribution of the polyethylene powder. Specifically, this is achieved by removing coarse and fine powders of the polyethylene powder, or by performing polymerization for polyethylene using a polymerization catalyst having a narrow particle size distribution.

The measurement of the pore size distribution with a mercury porosimeter can be carried out by a method described in Examples mentioned later.

(Isothermal Crystallization Time)

The isothermal crystallization time of the polyethylene powder of the present embodiment at 125° C. is preferably 7.0 minutes or shorter, more preferably 6.0 minutes or shorter, further preferably 5.0 minutes or shorter, as determined by isothermal crystallization time measurement using DSC.

In this context, the measurement of the isothermal crystallization time is carried out under the following <Conditions for measurement for isothermal crystallization time>:

<Isothermal Crystallization Time Conditions for measurement> step 1: retaining the polyethylene powder at 50° C. for 1 minute, followed by heating to 180° C. at a heating rate of 10° C./min;

step 2: retaining the polyethylene powder at 180° C. for 5 minutes, followed by cooling to 125° C. at a cooling rate of 80° C./min; and step 3: retaining the polyethylene powder at 125° C., wherein a time when the temperature reaches 125° C. is defined as the point of origin (0 min), and a time when an exothermic peak top assigned to crystallization is exhibited is regarded as the isothermal crystallization time.

The isothermal crystallization time of 7.0 minutes or shorter at 125° C. tends to decrease the crystal size of a gel in molding processing by a wet process to thereby improve the strength of a molded article.

Examples of the method for controlling the isothermal crystallization time include decreasing the crystal size of polyethylene. Examples of the method for decreasing the crystal size of polyethylene include, but are not limited to, preparing a catalyst for use in a polymerization step at a low temperature over a long time.

Specifically, the isothermal crystallization time can be determined by a method described in Examples mentioned later.

(Apparent Density)

The apparent density of the polyethylene powder of the present embodiment is preferably 0.30 g/mL or larger, more preferably 0.40 g/mL or larger, further preferably 0.50 g/mL or larger.

The polyethylene powder having an apparent density in the above range tends to have good handleability as a powder and therefore to have high productivity.

In general, the apparent density differs depending on a polymerization catalyst used. Particularly, the apparent density of the polyethylene powder can be controlled by adjusting the productivity of the polyethylene powder per unit catalyst. The apparent density of the polyethylene powder can be controlled by adjusting a polymerization temperature in polymerization for the polyethylene powder. The apparent density can be decreased by elevating the polymerization temperature. The apparent density of the polyethylene powder can also be controlled by adjusting a slurry concentration in a polymerization vessel where a polymerization step is carried out. The apparent density of the polyethylene powder can be increased by elevating the slurry concentration.

The apparent density of the polyethylene powder can be measured by a method described in Examples mentioned later.

(Lamellar Thickness)

The lamellar thickness of the polyethylene powder of the present embodiment is preferably 30 nm or smaller, more preferably 24 nm or smaller, further preferably 22 nm or smaller. The polyethylene powder having a lamellar thickness in the above range tends to improve the strength of a molded article.

Examples of the method for controlling the lamellar thickness of the polyethylene powder in the above range include adjusting a polymerization catalyst, a co-catalyst, a polymerization temperature, a polymerization pressure, a slurry concentration, or a residence time.

A metallocene catalyst is preferably used as a polymerization catalyst.

The lamellar thickness of the polyethylene powder can be measured by a method described in Examples mentioned later.

(Method for Producing Polyethylene Powder)

Examples of the method for producing the polyethylene powder of the present embodiment include, but are not limited to, (co)polymerizing ethylene or monomers including ethylene by a slurry polymerization method, a gas-phase polymerization method, or a solution polymerization method.

Among them, a slurry polymerization method, which can efficiently remove polymerization heat, is preferred.

In the slurry polymerization method, an inert hydrocarbon medium can be used as a medium, and the olefin itself may be used as a medium.

Examples of the inert hydrocarbon medium include, but are not limited to: aliphatic hydrocarbon such as propane, butane, isobutane, pentane, isopentane, hexane, heptane, octane, decane, dodecane, and kerosene; alicyclic hydrocarbon such as cyclopentane, cyclohexane, and methylcyclopentane; aromatic hydrocarbon such as benzene, toluene, and xylene; halogenated hydrocarbon such as ethyl chloride, chlorobenzene, and dichloromethane; and mixtures thereof.

In the method for producing the polyethylene powder of the present embodiment, the temperature of a polymerization vessel where a polymerization step is carried out is usually preferably 40° C. or higher and 100° C. or lower, more preferably 45° C. or higher and 95° C. or lower, further preferably 50° C. or higher and 90° C. or lower.

The polymerization temperature of 40° C. or higher tends to be able to perform industrially efficient production. On the other hand, the polymerization temperature of 100° C. or lower tends to be able to continuously perform stable operation.

In the method for producing the polyethylene powder of the present embodiment, the pressure of the polymerization vessel where a polymerization step is carried out is usually preferably 0.10 MPa or higher and 2.0 MPa or lower, more preferably 0.10 MPa or higher and 1.5 MPa or lower, further preferably 0.10 MPa or higher and 1.0 MPa or lower.

The polymerization reaction can be performed by any of batch, semicontinuous and continuous methods, and continuous polymerization is particularly preferred.

A partial high-temperature state due to rapid ethylene reaction can be suppressed by continuously supplying an ethylene gas, a solvent (e.g., hexane), a catalyst, and the like into a polymerization system while continuously discharging the ethylene gas, the solvent, the catalyst, and the like together with a produced polyethylene powder. This tends to more stabilize the polymerization system.

Examples of the catalyst for use in the production of the polyethylene powder of the present embodiment include, but are not limited to, Ziegler-Natta catalysts, metallocene catalysts, and Phillips catalysts.

A Ziegler-Natta catalyst described in Japanese Patent No. 5767202 can be suitably used. Examples of the metallocene catalyst include, but are not limited to, those described in Japanese Patent Laid-Open No. 2006-273977 and Japanese Patent No. 4868853.

The catalyst for use in the method for producing the polyethylene powder of the present embodiment may contain a co-catalyst such as triisobutylaluminium or Tebbe reagent.

The average particle size of the catalyst for use in the method for producing the polyethylene powder of the present embodiment is preferably 0.1 μm or larger and 20 μm or smaller, more preferably 0.2 μm or larger and 16 μm or smaller, further preferably 0.5 μm or larger and 12 μm or smaller.

The catalyst having an average particle size of 0.1 μm or larger tends to be able to prevent the resulting polyethylene powder from flying or adhering.

The catalyst having an average particle size of 20 μm or smaller tends to be able to prevent the polyethylene powder from becoming too large and settling out in a polymerization system, and tends to be able to prevent a line from being blocked in an aftertreatment step of the polyethylene powder, for example.

A particle size distribution as narrow as possible is preferred for the catalyst, and particles of fine and coarse powders can be removed using a sieve, centrifugation, or Cyclone.

The method for inactivating the catalyst used in the production of the polyethylene powder is not particularly limited and is preferably carried out after separation of the polyethylene powder from a solvent.

By adding an agent for inactivating the catalyst to the polyethylene powder thus separated from the solvent, the deposition of a catalyst component or the like dissolved in the solvent can be suppressed, and Ti, Al, or the like derived from the catalyst component can be thus reduced.

Examples of the agent inactivating the catalyst can include, but are not limited to, oxygen, water, alcohols, glycols, phenols, carbon monoxide, carbon dioxide, ethers, carbonyl compounds, and alkynes.

The weight-average molecular weight and number-average molecular weight of the polyethylene powder can be controlled, for example, by allowing hydrogen to exist in a polymerization system, or changing a polymerization temperature, as described in Western German International Patent Application Publication No. 3127133.

The addition of hydrogen as a chain transfer agent into a polymerization system tends to be able to control the weight-average molecular weight and number-average molecular weight of the polyethylene powder in proper ranges.

In the case of adding hydrogen into a polymerization system, the molar fraction of the hydrogen is preferably 0 mol % or more and 30 mol % or less, more preferably 0 mol % or more and 25 mol % or less, further preferably 0 mol % or more and 20 mol % or less.

Examples of the solvent separation technique in the method for producing the polyethylene powder of the present embodiment include, but are not particularly limited to, decantation, centrifugation, and filtration through a filter. Centrifugation is preferred in view of high separation efficiency between the polyethylene powder and the solvent.

In the method for producing the polyethylene powder of the present embodiment, a drying step is preferably carried out on the polyethylene powder thus separated from the solvent.

The drying temperature in the drying step is preferably 50° C. or higher and 150° C. or lower, more preferably 50°

C. or higher and 140° C. or lower, further preferably 50° C. or higher and 130° C. or lower. The drying temperature of 50° C. or higher permits efficient drying. On the other hand, the drying temperature of 150° C. or lower permits drying while suppressing the aggregation or thermal deterioration of the polyethylene powder.

(Additive)

The polyethylene powder of the present embodiment can contain other known components useful for polyethylene powder production, in addition to each component as described above.

The polyethylene powder of the present embodiment may further contain additives, for example, a neutralizing agent, an antioxidant, and a light stabilizer.

The neutralizing agent is used as a catcher for chlorine contained in polyethylene, or a molding processing aid. Examples of the neutralizing agent include, but are not limited to, stearates of alkaline earth metals such as calcium, magnesium, and barium.

The content of the neutralizing agent is not particularly limited and is preferably 5,000 ppm or less, more preferably 4,000 ppm or less, further preferably 3,000 ppm or less, based on the total amount of polyethylene.

When the polyethylene powder of the present embodiment is an ethylene polymer obtained by a slurry polymerization method using a metallocene catalyst, a halogen component may be eliminated from the catalyst component. In such a case, no neutralizing agent may be used.

Examples of the antioxidant include, but are not limited to, phenol antioxidants such as dibutylhydroxytoluene, pentaerythritol-tetrakis[3-(3,5-di-t-butyl-4-hydroxyphenyl)propionate], and octadecyl-3-(3,5-di-t-butyl-4-hydroxyphenyl) propionate.

The content of the antioxidant is not particularly limited and is preferably 5,000 ppm or less, more preferably 4,000 ppm or less, further preferably 3,000 ppm or less.

Examples of the light stabilizer include, but are not limited to: benzotriazole light stabilizers such as 2-(5-methyl-2-hydroxyphenyl)benzotriazole and 2-(3-t-butyl-5-methyl-2-hydroxyphenyl)-5-chlorobenzotriazole; and hindered amine light stabilizers such as bis(2,2,6,6-tetramethyl-4-piperidine)sebacate and poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}].

The content of the light stabilizer is not particularly limited and is preferably 5,000 ppm or less, more preferably 4,000 ppm or less, further preferably 3,000 ppm or less.

The content of each additive contained in the polyethylene powder of the present embodiment can be determined by extracting the additive in the polyethylene powder for 6 hours by Soxhlet extraction with tetrahydrofuran (THF), and separating and quantifying the extracts by liquid chromatography.

(Purpose)

The polyethylene powder of the present embodiment swells rapidly in a solvent such as liquid paraffin, offers a uniform appearance or shape of a molded article, produces a molded article with smooth surface even by high-speed molding, and can reduce the frequency of breaking of a molded article in a drawing step. Accordingly, the polyethylene powder of the present embodiment can be applied to various purposes in molding by a wet process.

[Molded Article]

The molded article of the polyethylene powder of the present embodiment is a molded article of the polyethylene powder of the present embodiment mentioned above.

The molded article of the present embodiment has a uniform appearance or shape, has smooth surface even by high-speed molding, and can reduce the frequency of breaking of the molded article in a drawing step. Accordingly, the molded article can be particularly suitably used as a microporous membrane or fiber.

Examples of the microporous membrane include, but are not particularly limited to, separators for secondary batteries, in particular, separators for lithium ion secondary batteries, and separators for lead storage batteries.

By exploiting excellent features of abrasion resistance, high slidability, high strength, and high impact resistance, which are the characteristics of a high-molecular-weight polyethylene powder, the polyethylene powder of the present embodiment can be used for, for example, but not particularly limited to, gears, rolls, curtain rails, pachinko ball rails, lining sheets of storage silo for cereals or the like, sliding-imparting coatings for rubber products or the like, ski board materials and ski soles, and lining materials of heavy machines such as trucks or loading shovels, by molding in a solid state such as extrusion molding, press molding, or cutting.

The polyethylene powder of the present embodiment can also be used for, for example, but not particularly limited to, molded articles obtained by the sintering of the polyethylene powder, filters, or dust trap materials.

EXAMPLES

Hereinafter, the present embodiment will be described in more detail by way of specific Examples and Comparative Examples. However, the present embodiment is not limited by Examples and Comparative Examples given below by any means.

Methods for measuring various characteristics and physical properties will be described below.

Methods for Measuring Various Characteristics and Physical Properties (1) Intrinsic Viscosity (IV)

The intrinsic viscosity (IV) of a polyethylene powder was measured in accordance with IS01628-3 (2010).

In the preparation of a solution, the polyethylene powder was weighed in the range of 4.0 to 4.5 mg and dissolved in 20 mL of decahydronaphthalene deaerated with a vacuum pump and purged with nitrogen (supplemented with 1 g/L 2,6-di-t-butyl-4-methylphenol; hereinafter, referred to as decalin), by stirring at 150° C. for 90 minutes in a dissolution tube the air inside which was evacuated using a vacuum pump and purged with nitrogen.

The viscosity tube used was a Cannon-Fenske viscometer (manufactured by Sibata Scientific Technology Ltd.: product No. —100).

(2) Elastic Limit Strain

Measurement in a strain dependence test was performed under the conditions for measurement of viscoelasticity of slurry on slurry consisting of 30 parts by mass of a polyethylene powder and 70 parts by mass of liquid paraffin as described below.

The polyethylene powder used was a sample from which particles that did not pass through a sieve having an opening of 425 μm in accordance with JIS Z 8801: 2019 were removed.

The elastic limit strain was determined by the two-tangent method.

The elastic limit strain obtained by measurement at a swelling time t (h) of 0 hours was defined as $\gamma_0$, and the elastic limit strain obtained by measurement at a swelling time t (h) of 1 hour was defined as $\gamma_1$, wherein the swelling time t (h) is as defined below.

The elastic limit strain ratio $\gamma_0/\gamma_1$ calculated using these values.

<Conditions for Measurement of Viscoelasticity of Slurry>

Measurement apparatus: MARSIII manufactured by Thermo Fisher Scientific, Inc.

Stage: 20 mmɸ

Plate: 20 mmɸ parallel plate

Gap: 0.5 mm

Slurry composition: 30 parts by mass of the polyethylene powder and 70 parts by mass of liquid paraffin Conditions for measurement: the strain dependence test is conducted by the following steps 1 and 2:

step 1 of keeping a temperature of a slurry at 100° C. for the swelling time t (h) in a nitrogen atmosphere on a sample stage; and step 2 of conducting the strain dependence test under conditions of 180° C. and a frequency of 1 Hz in a nitrogen atmosphere.

(3) Pore Size Distribution

The pore size distribution of a polyethylene powder was measured using AutoPore IV9500 manufactured by Shimadzu Corp. as a mercury porosimeter. The value of the pore size (μm) at the peak of 10 μm or larger was thus determined.

In pretreatment, approximately 0.5 g of the polyethylene powder was placed in a sample cell, and deaerated and dried at ordinary temperature in a low-pressure part. Then, the sample container was filled with mercury, and measurement was performed.

The measurement was performed under conditions for measurement of 69 Pa ($N_2$ pressure) for the low-pressure part, 21 to 228 MPa for a high-pressure part, and room temperature.

(4) Average Particle Size $D_{50}$

The average particle size $D_{50}$ of a polyethylene powder was determined by the dry sieving method in the following manner.

100 g of the polyethylene powder was weighed into a 200 mL container, to which 1 g of carbon black was then added, and the mixture was thoroughly stirred with a medicine spoon.

When the stirred polyethylene powder was classified through sieves having openings of 300 μm, 212 μm, 150 μm, 106 μm, 75 μm, and 53 μm in accordance with the specification of JIS Z 8801: 2019, the masses of particles of the polyethylene powder remaining on the respective sieves were integrated from the smaller aperture size. A particle size that reached 50% by mass in the resulting integral curve was regarded as the average particle size $D_{50}$ of the polyethylene powder.

(5) Content of α-Olefin

The content (mol %) of a polymer unit derived from α-olefin in a polyethylene powder was measured under conditions for measurement given below in accordance with the method disclosed in G. J. Ray et al., Macromolecules, 10, 773 (1977).

The content of α-olefin was calculated from area intensity of the signal of methylene carbon found in $^{13}C$-NMR spectra in the measurement.

When the content of α-olefin was equal to or lower than the detection limit, it was determined that the polyethylene powder was an ethylene homopolymer, and it is indicated by "○" in the table. When the content was larger than the detection limit, it is indicated by "X" in the table below.

(Conditions for Measurement)

Measurement apparatus: ECS-400 manufactured by JEOL Ltd.

Observed nucleus: $^{13}C$

Observation frequency: 100.53 MHz

Pulse width: 450 (7.5 μsec)

Pulse program: single pulse dec

PD: 5 sec (6) Apparent Density

The apparent density of the polyethylene powder was measured in accordance with JIS K 7365: 1999.

The drop height from a funnel to a receiver was adjusted to 50 mm.

(7) Isothermal Crystallization Time

An isothermal crystallization time (min) at 125° C. was measured using a differential scanning calorimeter (DSC) under <Conditions for measurement for isothermal crystallization time> given below.

In step 3 of the following conditions, the time when the temperature reached 125° C. was defined as the point of origin (0 min), and the time when an exothermic peak top assigned to crystallization was exhibited was regarded as the isothermal crystallization time.

<Isothermal Crystallization Time Conditions for Measurement> step 1: retaining the polyethylene powder at 50° C. for 1 minute, followed by heating to 180° C. at a heating rate of 10° C./min;

step 2: retaining the polyethylene powder at 180° C. for 5 minutes, followed by cooling to 125° C. at a cooling rate of 80° C./min; and step 3: retaining the polyethylene powder at 125° C.

(8) Lamellar Thickness

The lamellar thickness of a polyethylene powder was determined by carrying out wide-angle X ray diffractometry (XRD) and small-angle X ray scattering (SAXS) measurement.

The wide-angle X ray diffractometry (XRD) on the polyethylene powder was performed by the reflection method under the following conditions.

Measurement apparatus: Ultima-IV manufactured by Rigaku Corp.

X ray source: Cu tube

Voltage of tube: 40 kV

Current of tube: 40 mA

Optical system: focusing optical system

Cu-Kβ ray filter: Ni foil

Absorber: none

Detector: D/teX Ultra (one-dimensional detector)

Measurement method: θ/2θ method

Slit: DS=½°, SS=open, longitudinal slit=10 mm

Camera length: 285 mm

Scan range: 5 to 35°

Scan step: 0.02°

A crystallinity was calculated from the area ratio of a diffraction peak derived from crystals to the whole XRD profile.

The small-angle X ray scattering (SAXS) of an ultra-high molecular weight polyethylene powder was measured by the transmission method under conditions given below. In pretreatment, a sample was impregnated with propylene glycol (PG) before measurement, in order to reduce scattering derived from particle surface.

Apparatus: NANOPIX manufactured by Rigaku Corp.

X ray wavelength: 0.154 nm

Optical system: point collimation (1st: 0.55 mmφ, 2nd: open, guard: 0.35 mmφ)

Detector: HyPix-6000 (two-dimensional semiconductor detector)

Camera length: 1312 mm

Exposure time: 5 min/sample

Environment surrounding sample cell: atmosphere

A crystal long period was analyzed by the following method.

A SAXS profile calculated by circular averaging was multiplied by a square of an absolute value q of a scattering vector. A plot was made with the SAXS profile multiplied by a square of the absolute value of a scattering vector on the ordinate against a natural logarithm of the absolute value of the scattering vector on the abscissa. A straight baseline was drawn in the range of q=0.1 to 0.6 and fitted by Gauss function. A position that attained maximum intensity was regarded as a peak position $q_m$ derived from a crystal long period. A crystal long period d was determined according to the following expression.

$$d=2\pi/q_m$$

The lamellar thickness of the ultra-high molecular weight polyethylene powder was determined according to the following expression.

Lamellar thickness=Crystal long period $d$×(Crystallinity/100)

(9) Appearance and Shape Evaluation of Molded Article

<(a) for Polyethylene Powder Having an Intrinsic Viscosity (IV) Less than 13.0 dL/g (Evaluation of Microporous Membrane)>

12 g of a polyethylene powder was dipped in 28 g of liquid paraffin (P-350(™) manufactured by MORESCO Corp.) and kept therein at 100° C. for 1 hour for swelling to obtain slurry.

40 g of the liquid in a slurry state thus prepared was added to Labo Plastomill (manufactured by Toyo Seiki Seisakusho, Ltd., model 4C150, mixer format R-60) and kneaded at a rotational speed of 50 rpm at 200° C. for 10 minutes to obtain a gel.

A pressure of 10 MPa was applied to the obtained gel at 180° C. for 10 minutes using a press so as to have a thickness of 0.8 mm, whereby the gel was molded into a sheet to obtain a gel sheet.

A 10 cm×10 cm square sample was cut out of the obtained gel sheet and subjected to simultaneous biaxial drawing at a vertical drawing ratio of 10 and a horizontal drawing ratio of 10 at a temperature of 115° C. and a drawing rate of 2000 mm/min to obtain a membrane.

A 25 cm×25 cm square sample was cut out of the central part of the drawn membrane, fixed to a metal frame, and impregnated with hexane for 20 minutes to extract liquid paraffin, followed by drying treatment, to thereby obtain a microporous membrane.

The appearance and shape of the microporous membrane were evaluated in terms of the degree of a membrane rupture or a defect according to criteria given below.

The defect is irregularities attributed to lumps of the polyethylene powder generated on membrane surface, and is also called fisheye.

[Evaluation Criteria]

A membrane having no rupture and having 0 or more and less than 5 defects was given ⊚.

A membrane having no rupture and having 5 or more and less than 10 defects was given ○.

A membrane having no rupture and having 10 or more defects was given Δ.

A membrane having a rupture was given X.

<(b) for Polyethylene Powder Having Intrinsic Viscosity (IV) of 13.0 dL/g or More (Evaluation of Fiber)>

When the total of the polyethylene powder and the liquid paraffin (P-350(™) manufactured by MORESCO Corp.) is 100 parts by mass, 5 parts by mass of the polyethylene powder, 95 parts by mass of the liquid paraffin, and 1 part by mass of an antioxidant (tetrakis[methylene(3,5-di-t-butyl-4-hydroxy-hydrocinnamate)]methane manufactured by Great Lakes Chemical Japan Corp. (product name: ANOX20)) were blended to prepare a liquid in a slurry state.

The liquid in a slurry state was kept at 100° C. for 1 hour for swelling.

Next, the liquid in a slurry state was added to a counter-rotating twin-screw extruder (model: 2D25S) for Labo Plastomill manufactured by Toyo Seiki Seisaku-sho, Ltd. (model: 4C150), and kneading operation was performed at a constant temperature of 200° C.

Then, the resultant was spun through a spinneret attached to the tip of the extruder. The temperature of the spinneret was 200° C., the discharge rate was 300 g/hr, and the pore size of the spinneret was 1.0 mm.

Next, the discharged thread containing liquid paraffin was wound at a location 2.0 m distant from the spinneret at a rate of 50 m/min and room temperature.

Subsequently, the wound thread was dipped in hexane for extraction operation in order to remove liquid paraffin from the thread, followed by drying for 24 hours or longer.

The obtained thread was primarily drawn at a rate of 20 mm/min in a thermostat set to 120° C., and subsequently secondarily drawn at a rate of 10 mm/min in a thermostat set to 140° C. immediately before the thread was broken, to obtain a drawn thread.

A thread diameter was measured at 0.5-m intervals over 10 μm of the obtained thread under an optical microscope, and an average thread diameter was determined.

Unevenness of the thread diameter was evaluated on the basis of the average thread diameter.

The appearance and shape of the thread were evaluated in terms of the degree of breaking or the unevenness of the thread diameter according to the following criteria.

[Evaluation Criteria]

A thread that was not broken during spinning and had unevenness of the thread diameter of less than ±5 μm with respect to the average thread diameter was given ⊚.

A thread that was not broken during spinning and had unevenness of the thread diameter of ±5 μm or more and less than ±10 μm with respect to the average thread diameter was given ○.

A thread that was rarely broken during spinning or had unevenness of the thread diameter of ±10 μm or more with respect to the average thread diameter was given Δ.

A thread that was frequently broken during spinning was given X.

(10) Swellability Evaluation

The swellability of a polyethylene powder was evaluated in the following manner.

Evaluation was performed in the same manner as described in the section (9) Appearance and shape evaluation of molded article, except that in the case of ⊚ or ○ in the evaluation in the section (9), the swelling time was shorten by 0.2 hours. This operation was repeated, and a swelling time when a sample was given Δ or X in the appearance and shape evaluation was determined.

The swellability was evaluated according to the following criteria on the basis of the results.

[Evaluation Criteria]

A polyethylene powder was given ⊚ in a case where the swelling time when a sample was given Δ or X in the section (9) Appearance and shape evaluation of molded article was 0.2 hours or shorter.

A polyethylene powder was given ○ in a case where the swelling time when a sample was given Δ or X in the section (9) Appearance and shape evaluation of molded article was more than 0.2 hours and 0.4 hours or shorter.

A polyethylene powder was given Δ in a case where the swelling time when a sample was given Δ or X in the section (9) Appearance and shape evaluation of molded article was more than 0.4 hours and 0.8 hours or shorter.

A polyethylene powder was given X in a case where the swelling time when a sample was given Δ or X in the section (9) Appearance and shape evaluation of molded article was more than 0.8 hours.

(11) Surface Smoothness Evaluation of Molded Article by High-Speed Molding

The surface smoothness of a molded article by high-speed molding was evaluated in the following manner. <(a) For polyethylene powder having an intrinsic viscosity (IV) less than 13.0 dL/g (evaluation of microporous membrane)>

Evaluation was performed in the same manner as described in the section (9) (a), except that the drawing rate in the section (9) (a) was changed to 20000 mm/min. The microporous membrane was evaluated for the surface smoothness of the molded article by high-speed molding in terms of the degree of a membrane rupture or a defect according to the following criteria.

[Evaluation Criteria]

A membrane having no rupture and having 0 or more and less than 5 defects was given ⊚.

A membrane having no rupture and having 5 or more and less than 10 defects was given ○.

A membrane having no rupture and having 10 or more defects was given Δ.

A membrane having a rupture was given X.

<(b) for Polyethylene Powder Having Intrinsic Viscosity (IV) of 13.0 dL/g or More (Evaluation of Fiber)>

Evaluation was performed in the same manner as described in the section (9) (b), except that the winding rate from the spinneret in the section (9) (b) was changed to 200 m/min. The thread was evaluated for the surface smoothness of the molded article by high-speed molding in terms of the degree of breaking or unevenness of the thread diameter according to the following criteria. [Evaluation criteria]A thread that was not broken during spinning and had unevenness of the thread diameter of less than ±5 μm with respect to the average thread diameter was given ⊚.

A thread that was not broken during spinning and had unevenness of the thread diameter of ±5 μm or more and less than ±10 μm with respect to the average thread diameter was given ○.

A thread that was rarely broken during spinning or had unevenness of the thread diameter of ±10 μm or more with respect to the average thread diameter was given Δ.

A thread that was frequently broken during spinning was given X.

[Production Example] Synthesis of Catalyst (Synthesis of Supported Metallocene Catalyst Component [A])

<(1) Starting Material: Preparation of Silica Component [a-1]>

Spherical silica having an average particle size of 7 μm, a surface area of 700 m²/g, and an intraparticle pore volume of 1.9 mL/g was calcined and dehydrated at 500° C. for 5 hours in a nitrogen atmosphere.

40 g of this dehydrated silica was dispersed in 800 mL of hexane in an autoclave with a capacity of 1.8 L in a nitrogen atmosphere to obtain slurry.

While the obtained slurry was kept at 20° C. with stirring, 100 mL of a hexane solution of triethylaluminium (concentration: 1 mol/L) was added dropwise thereto over 1 hour, followed by stirring at the same temperature as above for 2 hours.

Then, unreacted triethylaluminium in a supernatant was removed by the decantation of the obtained reaction mixture. In this way, 800 mL of hexane slurry of a silica component [a-1] treated with triethylaluminium was obtained.

<(2) Starting Material: Preparation of Component [a-2]>

200 mmol of [(N-t-butylamido) (tetramethyl-η5-cyclopentadienyl)dimethylsilane]titanium-1,3-pentadiene (hereinafter, referred to as "titanium complex") was dissolved in 1250 mL of Isopar E [trade name of a hydrocarbon mixture manufactured by Exxon Chemical (U.S.A.)], and the titanium complex concentration was adjusted to 0.1 mol/L by the preliminary addition of 40 mL of a hexane solution of 1 mol/L commercially available butylethylmagnesium and further the addition of hexane to obtain a component [a-2].

<(3) Starting Material: Preparation of Reaction Mixture [a-3]>

5.7 g of bis(hydrogenated tallow alkyl)methylammonium-tris(pentafluorophenyl) (4-hydroxyphenyl)borate (hereinafter, referred to as "borate") was added to 50 mL of toluene and dissolved to obtain a toluene solution of 100 mmol/L borate.

To this toluene solution of borate, 5 mL of a hexane solution of 1 mol/L ethoxy diethylaluminium was added at room temperature, and further, hexane was added such that the borate concentration in the solution was 70 mmol/L.

Then, the mixture was stirred at room temperature for 1 hour to obtain a reaction mixture [a-3] containing borate.

<(4) Synthesis of Supported Metallocene Catalyst [A]>

While 800 mL of the hexane slurry of the silica component [a-1] obtained in the section (1) was stirred at 20° C., 32 mL of the titanium complex [a-2] obtained in the section (2) and 46 mL of the reaction mixture [a-3] containing borate obtained in the section (3) were added thereto at the same time over 1 hour. The mixture was further stirred at the same temperature as above for 1 hour so that the titanium complex was reacted with the borate.

After the completion of reaction, a supernatant was removed, and unreacted catalyst starting materials were removed with hexane to obtain a supported metallocene catalyst [A](hereinafter, also referred to as a solid catalyst component [A]) in which an active catalyst species was formed on silica.

(Co-Catalyst: Synthesis of Starting Material [a-4])

An 8 L stainless autoclave thoroughly purged with nitrogen was charged with 2,000 mL of a hexane solution of 1 mol/L Ma₆(C₄H₉)₁₂Al(C₂H₅)₃ (corresponding to 2000 mmol in total of magnesium and aluminum), and pressure-fed with 240 mL of a hexane solution of 8.33 mol/L methyl hydrogen polysiloxane (manufactured by Shin-Etsu Chemical Co., Ltd.) with stirring at 80° C., and the stirring was further continued at 80° C. over 2 hours.

After the completion of reaction, the reaction solution was cooled to ordinary temperature and used as a starting material [a-4].

The starting material [a-4] had a concentration of 0.786 mol/L in total of magnesium and aluminum.

(Synthesis of Supported Ziegler-Natta Catalyst Component [B])

<(1) Starting Material: Preparation of [b-1]>

An 8 L stainless autoclave thoroughly purged with nitrogen was charged with 2,000 mL of a hexane solution containing 1 mol/L $Mg_6(C_4H_9)_{12}Al(C_2H_5)_3$ (corresponding to 2000 mmol in total of magnesium and aluminum). To this autoclave, 146 mL of a hexane solution of 5.47 mol/L n-butanol was added dropwise over 3 hours with stirring at 50° C. After the completion of dropwise addition, the line was washed with 300 mL of hexane. The stirring was further continued at 50° C. over 2 hours. After the completion of reaction, the reaction solution was cooled to ordinary temperature and used as a starting material [b-1]. The starting material [b-1] had a magnesium concentration of 0.704 mol/L.

<(2) Starting Material: Preparation of [b-2]>

An 8 L stainless autoclave thoroughly purged with nitrogen was charged with 2,000 mL of a hexane solution of 1 mol/L $Mg_6(C_4H_9)_{12}Al(C_2H_5)_3$ (corresponding to 2000 mmol in total of magnesium and aluminum), and pressure-fed with 240 mL of a hexane solution of 8.33 mol/L methyl hydrogen polysiloxane (manufactured by Shin-Etsu Chemical Co., Ltd.) with stirring at 80° C., and the stirring was further continued at 80° C. over 2 hours. After the completion of reaction, the reaction solution was cooled to ordinary temperature and used as a starting material [b-2]. The starting material [b-2] had a concentration of 0.786 mol/L in total of magnesium and aluminum.

<(3) Preparation of Support [B-1]>

An 8 L stainless autoclave thoroughly purged with nitrogen was charged with 1,000 mL of a hexane solution of 1 mol/L hydroxytrichlorosilane. To this autoclave, 1340 mL of a hexane solution of the organic magnesium compound as the starting material [b-1](corresponding to 943 mmol of magnesium) was added dropwise at –10° C. over 20 hours, and the reaction was further continued with stirring at –10° C. for 1 hour.

After the completion of reaction, a supernatant was removed, and the resulting solid was washed with 1,800 mL of hexane four times to obtain a support [B-1]. As a result of analyzing this support, the amount of magnesium contained per g of the solid was 7.5 mmol.

<(4) Synthesis of Supported Ziegler-Natta Catalyst Component [B] which is Solid Catalyst Component>

To 1,970 mL of the hexane slurry containing 110 g of the support [B-1], 103 mL of a hexane solution of 1 mol/L titanium tetrachloride and 131 mL of the starting material [b-2] were added at the same time over 3 hours with stirring at 10° C.

After the addition, the reaction was continued at 10° C. for 1 hour. After the completion of reaction, a supernatant was removed, and unreacted starting material components were removed by washing with hexane four times to obtain a supported Ziegler-Natta catalyst component [B] which was a solid catalyst component.

(Synthesis of Supported Ziegler-Natta Catalyst Component [C])

A supported Ziegler-Natta catalyst component [C] was synthesized in the same manner as the synthesis of the supported Ziegler-Natta catalyst [B] except that: in the synthesis of the Ziegler-Natta catalyst component [B], the temperature and the time were changed to 65° C. and 3 hours, respectively, when the hexane solution of titanium tetrachloride and the starting material [b-2] were added to the hexane slurry containing the support [B-1]; and after the addition, the reaction was continued at 65° C. for 1 hour.

(Co-Catalyst)

A mixture of commercially available triisobutylaluminium and diisobutylaluminium hydride (9:1 (mass ratio in order) mixture) was used as a co-catalyst 1.

The starting material [a-4] was used as a co-catalyst 2.

Example 1

The air inside a vessel-type 1.5 L polymerization reactor equipped with a stirrer was evacuated, and 500 mL of dehydrated normal hexane was then introduced into the polymerization reactor. Subsequently, 0.6 mL of the co-catalyst 1 dispersed in 100 mL of dehydrated normal hexane was introduced into the polymerization reactor, and the temperature of the polymerization reactor was adjusted to 78° C. Stirring was started at a rotational speed of 1,000 rpm. Subsequently, hydrogen for adjusting an intrinsic viscosity (IV) was introduced into the polymerization reactor such that its internal pressure was 0.9 kPaG. Further, ethylene and a very small amount (0.02 mol %) of 1-butene (comonomer) for controlling the number of tie molecules were introduced into the polymerization reactor such that its internal pressure was 0.3 MPaG. Then, 5.0 mg of the supported Ziegler-Natta catalyst component [B] dispersed in 200 mL of dehydrated normal hexane was introduced into the polymerization reactor, and batch polymerization reaction was performed for 1.0 hour. During the polymerization reaction, the internal pressure of the polymerization reactor was appropriately maintained by additionally introducing ethylene and 0.02 mol % of 1-butene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.0 hours to obtain a polyethylene powder.

The yield of the polyethylene powder was 100.7 g, and catalytic activity (amount of polyethylene obtained per unit catalyst weight) was 20130 (g-PE/g-catalyst). A particle size distribution was adjusted by removing coarse and fine powders using sieves with openings of 300 μm and 75 μm. After addition of 500 ppm of calcium stearate, the physical property evaluation of the polyethylene powder was carried out. The results of evaluating the polyethylene powder are shown in Table 1.

Example 2

The air inside a vessel-type 1.5 L polymerization reactor equipped with a stirrer was evacuated, and 500 mL of dehydrated normal hexane was then introduced into the polymerization reactor. Subsequently, 0.6 mL of the co-catalyst 1 dispersed in 100 mL of dehydrated normal hexane was introduced into the polymerization reactor, and the temperature of the polymerization reactor was adjusted to 78° C. Stirring was started at a rotational speed of 1,000 rpm. Subsequently, hydrogen for adjusting an intrinsic viscosity (IV) was introduced into the polymerization reactor such that its internal pressure was 147 kPaG. Further, ethylene and a very small amount (0.02 mol %) of 1-butene (comonomer) for controlling the number of tie molecules were introduced into the polymerization reactor such that its internal pressure was 0.5 MPaG. Then, 10.0 mg of the supported Ziegler-Natta catalyst component [B] dispersed in 200 mL of dehydrated normal hexane was introduced into the polymerization reactor, and batch polymerization reaction was performed for 1.0 hour. During the polymerization reaction, the internal pressure of the polymerization reactor was appropriately maintained by additionally introducing ethylene and 0.02 mol % of 1-butene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.0 hours to obtain a polyethylene powder.

The yield of the polyethylene powder was 109.8 g, and catalytic activity (amount of polyethylene obtained per unit catalyst weight) was 10981 (g-PE/g-catalyst). A particle size distribution was adjusted by removing coarse and fine powders using sieves with openings of 300 μm and 75 μm. After addition of 1000 ppm of calcium stearate, the physical property evaluation of the polyethylene powder was carried out. The results of evaluating the polyethylene powder are shown in Table 1.

Example 3

The air inside a vessel-type 1.5 L polymerization reactor equipped with a stirrer was evacuated, and 500 mL of dehydrated normal hexane was then introduced into the polymerization reactor. Subsequently, 0.6 mL of the co-catalyst 1 dispersed in 100 mL of dehydrated normal hexane was introduced into the polymerization reactor, and the temperature of the polymerization reactor was adjusted to 81° C. Stirring was started at a rotational speed of 1,000 rpm. Subsequently, hydrogen for adjusting an intrinsic viscosity (IV) was introduced into the polymerization reactor such that its internal pressure was 10.5 kPaG. Further, ethylene and a very small amount (0.02 mol %) of 1-butene (comonomer) for controlling the number of tie molecules were introduced into the polymerization reactor such that its internal pressure was 0.5 MPaG. Then, 5.0 mg of the supported Ziegler-Natta catalyst component [B] dispersed in 200 mL of dehydrated normal hexane was introduced into the polymerization reactor, and batch polymerization reaction was performed for 1.0 hour. During the polymerization reaction, the internal pressure of the polymerization reactor was appropriately maintained by additionally introducing ethylene and 0.02 mol % of 1-butene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.0 hours to obtain a polyethylene powder.

The yield of the polyethylene powder was 125.2 g, and catalytic activity (amount of polyethylene obtained per unit catalyst weight) was 25044 (g-PE/g-catalyst). Scales or extremely coarse powders were removed using a sieve having an opening of 425 μm. Then, the physical property evaluation of the polyethylene powder was carried out. The results of evaluating the polyethylene powder are shown in Table 1.

Example 4

The air inside a vessel-type 1.5 L polymerization reactor equipped with a stirrer was evacuated, and 500 mL of dehydrated normal hexane was then introduced into the polymerization reactor. Subsequently, 0.6 mL of the co-catalyst 1 dispersed in 100 mL of dehydrated normal hexane was introduced into the polymerization reactor, and the temperature of the polymerization reactor was adjusted to 81° C. Stirring was started at a rotational speed of 1,000 rpm. Subsequently, hydrogen for adjusting an intrinsic viscosity (IV) was introduced into the polymerization reactor such that its internal pressure was 8.0 kPaG. Further, ethylene and a very small amount (0.02 mol %) of 1-butene (comonomer) for controlling the number of tie molecules were introduced into the polymerization reactor such that its internal pressure was 0.25 MPaG. Then, 20.0 mg of the supported Ziegler-Natta catalyst component [B] dispersed in 200 mL of dehydrated normal hexane was introduced into the polymerization reactor, and batch polymerization reaction was performed for 1.0 hour. During the polymerization reaction, the internal pressure of the polymerization reactor was appropriately maintained by additionally introducing ethylene and 0.02 mol % of 1-butene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.0 hours to obtain a polyethylene powder.

The yield of the polyethylene powder was 85.3 g, and catalytic activity (amount of polyethylene obtained per unit catalyst weight) was 4264 (g-PE/g-catalyst). A particle size distribution was adjusted by removing coarse and fine powders using sieves with openings of 300 μm and 75 μm. After addition of 500 ppm of calcium stearate, the physical property evaluation of the polyethylene powder was carried out. The results of evaluating the polyethylene powder are shown in Table 1.

Example 5

Two-stage polymerization was performed in two polymerization tanks connected in series by the continuous slurry polymerization method using the supported Ziegler-Natta catalyst component [B] and the co-catalyst 1. The comonomer used was 1-butene, and dehydrated and deoxygenized hexane was used as a solvent. The polymerization tank of the first stage was fed with ethylene as a monomer and 1-butene as a comonomer, and polymerization was performed at a temperature of 70° C., a pressure of 0.32 MPaG, a hydrogen concentration of 3.9 mol %, and a 1-butene concentration of 0.41 mol %. The polymerization tank of the second stage was fed with ethylene alone, and polymerization was performed at 78° C., 0.51 MPaG, and a hydrogen concentration of 10.7 mol %. The ratio of the amount of production of a component produced in the polymerization tank of the first stage was set to 70% by mass, and the ratio of the amount of production of a component produced in the polymerization tank of the second stage was set to 30% by mass. The obtained solid component was placed in a stainless beaker with an aperture of 68 mm and dried at 70° C. for 2.0 hours to obtain a polyethylene powder.

Catalytic activity in the polymerization tank of the first stage determined from the amount of the catalyst introduced and the amount of ethylene consumed was 18678 (g-PE/g-catalyst), and catalytic activity in the polymerization tank of the second stage was 6779 (g-PE/g-catalyst).

Scales or extremely coarse powders were removed using a sieve having an opening of 425 μm. After addition of 1000 ppm of calcium stearate, the physical property evaluation of the polyethylene powder was carried out. The results of evaluating the polyethylene powder are shown in Table 1.

Example 6

The air inside a vessel-type 1.5 L polymerization reactor equipped with a stirrer was evacuated, and 500 mL of dehydrated normal hexane was then introduced into the polymerization reactor. Subsequently, 0.6 mL of the co-catalyst 1 dispersed in 100 mL of dehydrated normal hexane was introduced into the polymerization reactor, and the temperature of the polymerization reactor was adjusted to 71° C. Stirring was started at a rotational speed of 1,000 rpm. Subsequently, hydrogen for adjusting an intrinsic viscosity (IV) was introduced into the polymerization reactor such that its internal pressure was 0.2 kPaG. Further, ethylene and a very small amount (0.02 mol %) of 1-butene (comonomer) for controlling the number of tie molecules were introduced into the polymerization reactor such that its internal pressure was 0.4 MPaG. Then, 5.0 mg of the supported Ziegler-Natta catalyst component [B] dispersed in 200 mL of dehydrated normal hexane was introduced into the polymerization reactor, and batch polymerization reaction was performed for 1.0 hour. During the polymerization reaction, the internal pressure of the polymerization reactor was appropriately maintained by additionally introducing ethylene and 0.02 mol % of 1-butene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.0 hours to obtain a polyethylene powder.

The yield of the polyethylene powder was 100.2 g, and catalytic activity (amount of polyethylene obtained per unit catalyst weight) was 20041 (g-PE/g-catalyst). A particle size distribution was adjusted by removing coarse and fine powders using sieves with openings of 300 μm and 75 μm. Then, the physical property evaluation of the polyethylene powder was carried out. The results of evaluating the polyethylene powder are shown in Table 1.

Example 7

Two-stage polymerization was performed in two polymerization tanks connected in series by the continuous slurry polymerization method using the supported Ziegler-Natta catalyst component [C] and the co-catalyst 1. The comonomer used was 1-butene, and dehydrated and deoxygenized hexane was used as a solvent. The polymerization tank of the first stage was fed with ethylene as a monomer and 1-butene as a comonomer, and polymerization was performed at a temperature of 70° C., a pressure of 0.32 MPaG, a hydrogen concentration of 0.01 mol %, and a 1-butene concentration of 0.50 mol %. The polymerization tank of the second stage was fed with ethylene and a very small amount (0.02 mol %) of 1-butene (comonomer) for controlling the number of tie molecules, and polymerization was performed at 70° C., 0.51 MPaG, and a hydrogen concentration of 0.03 mol %. The ratio of the amount of production of a component produced in the polymerization tank of the first stage was set to 50% by mass, and the ratio of the amount of production of a component produced in the polymerization tank of the second stage was set to 50% by mass. The obtained solid component was placed in a stainless beaker with an aperture of 68 mm and dried at 100° C. for 2.0 hours to obtain a polyethylene powder.

Catalytic activity in the polymerization tank of the first stage determined from the amount of the catalyst introduced and the amount of ethylene consumed was 12204 (g-PE/g-catalyst), and catalytic activity in the polymerization tank of the second stage was 12175 (g-PE/g-catalyst).

A particle size distribution was adjusted by removing coarse and fine powders using sieves with openings of 300

μm and 75 μm. After addition of 500 ppm of calcium stearate, the physical property evaluation of the polyethylene powder was carried out. The results of evaluating the polyethylene powder are shown in Table 1.

Example 8

The air inside a vessel-type 1.5 L polymerization reactor equipped with a stirrer was evacuated, and 500 mL of dehydrated normal hexane was then introduced into the polymerization reactor. Subsequently, 0.6 mL of the co-catalyst 1 dispersed in 100 mL of dehydrated normal hexane was introduced into the polymerization reactor, and the temperature of the polymerization reactor was adjusted to 75° C. Stirring was started at a rotational speed of 1,000 rpm. Subsequently, hydrogen for adjusting an intrinsic viscosity (IV) was introduced into the polymerization reactor such that its internal pressure was 0.5 kPaG. Further, ethylene and a very small amount (0.02 mol %) of 1-butene (comonomer) for controlling the number of tie molecules were introduced into the polymerization reactor such that its internal pressure was 0.5 MPaG. Then, 10.0 mg of the supported Ziegler-Natta catalyst component [B] dispersed in 200 mL of dehydrated normal hexane was introduced into the polymerization reactor, and batch polymerization reaction was performed for 1.0 hour. During the polymerization reaction, the internal pressure of the polymerization reactor was appropriately maintained by additionally introducing ethylene and 0.02 mol % of 1-butene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.0 hours to obtain a polyethylene powder.

The yield of the polyethylene powder was 114.7 g, and catalytic activity (amount of polyethylene obtained per unit catalyst weight) was 11468 (g-PE/g-catalyst). A particle size distribution was adjusted by removing coarse and fine powders using sieves with openings of 300 μm and 75 μm. After addition of 1000 ppm of calcium stearate, the physical property evaluation of the polyethylene powder was carried out. The results of evaluating the polyethylene powder are shown in Table 1.

Example 9

Two-stage polymerization was performed in two polymerization tanks connected in series by the continuous slurry polymerization method using the supported Ziegler-Natta catalyst component [C] and the co-catalyst 1. The comonomer used was 1-butene, and dehydrated and deoxygenized hexane was used as a solvent. The polymerization tank of the first stage was fed with ethylene as a monomer and 1-butene as a comonomer, and polymerization was performed at a temperature of 74° C., a pressure of 0.27 MPaG, a hydrogen concentration of 0.0 mol %, and a 1-butene concentration of 3.97 mol %. The polymerization tank of the second stage was fed with ethylene and a very small amount (0.02 mol %) of 1-butene (comonomer) for controlling the number of tie molecules, and polymerization was performed at 70° C., 0.45 MPaG, and a hydrogen concentration of 0.0 mol %. The ratio of the amount of production of a component produced in the polymerization tank of the first stage was set to 60% by mass, and the ratio of the amount of production of a component produced in the polymerization tank of the second stage was set to 40% by mass. The obtained solid component was placed in a stainless beaker with an aperture of 68 mm and dried at 100° C. for 2.0 hours to obtain a polyethylene powder.

Catalytic activity in the polymerization tank of the first stage determined from the amount of the catalyst introduced and the amount of ethylene consumed was 15808 (g-PE/g-catalyst), and catalytic activity in the polymerization tank of the second stage was 10585 (g-PE/g-catalyst).

A particle size distribution was adjusted by removing coarse and fine powders using sieves with openings of 300 μm and 75 μm. Then, the physical property evaluation of the polyethylene powder was carried out. The results of evaluating the polyethylene powder are shown in Table 1.

Example 10

The air inside a vessel-type 1.5 L polymerization reactor equipped with a stirrer was evacuated, and 500 mL of dehydrated normal hexane was then introduced into the polymerization reactor. Subsequently, 0.6 mL of the co-catalyst 2 dispersed in 100 mL of dehydrated normal hexane was introduced into the polymerization reactor, and the temperature of the polymerization reactor was adjusted to 82° C. Stirring was started at a rotational speed of 1,000 rpm. Subsequently, ethylene and a very small amount (0.02 mol %) of 1-butene (comonomer) for controlling the number of tie molecules were introduced into the polymerization reactor such that its internal pressure was 0.8 MPaG. Then, 20.0 mg of the supported metallocene catalyst [A] dispersed in 200 mL of dehydrated normal hexane was introduced into the polymerization reactor, and batch polymerization reaction was performed for 1.0 hour. During the polymerization reaction, the internal pressure of the polymerization reactor was appropriately maintained by additionally introducing ethylene and 0.02 mol % of 1-butene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.0 hours to obtain a polyethylene powder.

The yield of the polyethylene powder was 143.3 g, and catalytic activity (amount of polyethylene obtained per unit catalyst weight) was 7165 (g-PE/g-catalyst). A particle size distribution was adjusted by removing coarse and fine powders using sieves with openings of 300 μm and 75 μm. After addition of 1000 ppm of calcium stearate, the physical property evaluation of the polyethylene powder was carried out. The results of evaluating the ultra-high molecular weight polyethylene powder are shown in Table 1.

Example 11

The air inside a vessel-type 1.5 L polymerization reactor equipped with a stirrer was evacuated, and 500 mL of dehydrated normal hexane was then introduced into the polymerization reactor. Subsequently, 0.6 mL of the co-catalyst 1 dispersed in 100 mL of dehydrated normal hexane was introduced into the polymerization reactor, and the temperature of the polymerization reactor was adjusted to 55° C. Stirring was started at a rotational speed of 1,000 rpm. Subsequently, ethylene and a very small amount (0.02 mol %) of 1-butene (comonomer) for controlling the number of tie molecules were introduced into the polymerization reactor such that its internal pressure was 0.5 MPaG. Then, 20.0 mg of the supported Ziegler-Natta catalyst component [B] dispersed in 200 mL of dehydrated normal hexane was introduced into the polymerization reactor, and batch polymerization reaction was performed for 1.0 hour. During the polymerization reaction, the internal pressure of the polymerization reactor was appropriately maintained by additionally introducing ethylene and 0.02 mol % of 1-butene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.0 hours to obtain a polyethylene powder.

The yield of the polyethylene powder was 87.3 g, and catalytic activity (amount of polyethylene obtained per unit catalyst weight) was 4367 (g-PE/g-catalyst). A particle size distribution was adjusted by removing coarse and fine powders using sieves with openings of 300 μm and 75 μm. Then, the physical property evaluation of the polyethylene powder was carried out. The results of evaluating the polyethylene powder are shown in Table 1.

Comparative Example 1

The air inside a vessel-type 1.5 L polymerization reactor equipped with a stirrer was evacuated, and 500 mL of dehydrated normal hexane was then introduced into the polymerization reactor. Subsequently, 0.6 mL of the co-catalyst 2 dispersed in 100 mL of dehydrated normal hexane was introduced into the polymerization reactor, and the temperature of the polymerization reactor was adjusted to 75° C. Stirring was started at a rotational speed of 1,000 rpm. Subsequently, ethylene was introduced into the polymerization reactor such that its internal pressure was 0.8 MPaG. Then, 20.0 mg of the supported metallocene catalyst [A] dispersed in 200 mL of dehydrated normal hexane was introduced into the polymerization reactor, and batch polymerization reaction was performed for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 70° C. for 2.0 hours to obtain a polyethylene powder.

The yield of the polyethylene powder was 135.1 g, and catalytic activity (amount of polyethylene obtained per unit catalyst weight) was 6757 (g-PE/g-catalyst). A particle size distribution was adjusted by removing coarse and fine powders using sieves with openings of 300 μm and 75 μm. After addition of 1000 ppm of calcium stearate, the physical property evaluation of the polyethylene powder was carried out. The results of evaluating the polyethylene powder are shown in Table 2.

Comparative Example 2

Two-stage polymerization was performed with two polymerization tanks connected in series by the continuous slurry polymerization method using the supported Ziegler-Natta catalyst component [C] and the co-catalyst 1. Dehydrated and deoxygenized hexane was used as a solvent. The polymerization tank of the first stage was fed with ethylene as a monomer, and polymerization was performed at a temperature of 78° C., a pressure of 0.42 MPaG, and a hydrogen concentration of 34.5 mol %. At the second stage, polymerization was performed at 78° C., 0.5 MPaG, and a hydrogen concentration of 51.8 mol %. The ratio of the amount of production of a component produced in the polymerization tank of the first stage was set to 50% by mass, and the ratio of the amount of production of a component produced in the polymerization tank of the second stage was set to 50% by mass. The obtained solid component was placed in a stainless beaker with an aperture of 68 mm and dried at 70° C. for 2.0 hours to obtain a polyethylene powder.

Catalytic activity (amount of polyethylene obtained per unit catalyst weight) in the polymerization tank of the first stage determined from the amount of the catalyst introduced and the amount of ethylene consumed was 8755 (g-PE/g-catalyst), and catalytic activity in the polymerization tank of the second stage was 8861 (g-PE/g-catalyst).

A particle size distribution was adjusted by removing coarse and fine powders using sieves with openings of 300 μm and 75 μm. After addition of 500 ppm of calcium stearate, the physical property evaluation of the polyethylene powder was carried out. The results of evaluating the polyethylene powder are shown in Table 2.

Comparative Example 3

The air inside a vessel-type 1.5 L polymerization reactor equipped with a stirrer was evacuated, and 500 mL of dehydrated normal hexane was then introduced into the polymerization reactor. Subsequently, 0.6 mL of the co-catalyst 1 dispersed in 100 mL of dehydrated normal hexane was introduced into the polymerization reactor, and the temperature of the polymerization reactor was adjusted to 55° C. Stirring was started at a rotational speed of 1,000 rpm. Subsequently, hydrogen for adjusting an intrinsic viscosity (IV) was introduced into the polymerization reactor such that its internal pressure was 0.065 kPaG. Further, ethylene was introduced into the polymerization reactor such that its internal pressure was 0.5 MPaG. Then, 20.0 mg of the supported Ziegler-Natta catalyst component [B] dispersed in 200 mL of dehydrated normal hexane was introduced into the polymerization reactor, and batch polymerization reaction was performed for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 70° C. for 2.0 hours to obtain a polyethylene powder.

The yield of the polyethylene powder was 88.3 g, and catalytic activity (amount of polyethylene obtained per unit catalyst weight) was 4413 (g-PE/g-catalyst). Scales or extremely coarse powders were removed using a sieve having an opening of 425 μm. Then, the physical property evaluation of the polyethylene powder was carried out. The results of evaluating the polyethylene powder are shown in Table 2.

Comparative Example 4

The air inside a vessel-type 1.5 L polymerization reactor equipped with a stirrer was evacuated, and 500 mL of dehydrated normal hexane was then introduced into the polymerization reactor. Subsequently, 0.6 mL of the co-catalyst 1 dispersed in 100 mL of dehydrated normal hexane was introduced into the polymerization reactor, and the temperature of the polymerization reactor was adjusted to 57° C. Stirring was started at a rotational speed of 1,000 rpm. Subsequently, hydrogen for adjusting an intrinsic viscosity (IV) was introduced into the polymerization reactor such that its internal pressure was 0.10 kPaG. Further, ethylene and a very small amount (0.02 mol %) of 1-butene (comonomer) for controlling the number of tie molecules were introduced into the polymerization reactor such that its internal pressure was 0.5 MPaG. Then, 20.0 mg of the supported Ziegler-Natta catalyst component [B] dispersed in 200 mL of dehydrated normal hexane was introduced into the polymerization reactor, and batch polymerization reaction was performed for 1.0 hour. During the polymerization reaction, the internal pressure of the polymerization reactor was appropriately maintained by additionally introducing ethylene and 0.02 mol % of 1-butene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.0 hours to obtain a polyethylene powder.

The yield of the polyethylene powder was 82.4 g, and catalytic activity (amount of polyethylene obtained per unit catalyst weight) was 4122 (g-PE/g-catalyst). Scales or extremely coarse powders were removed using a sieve having an opening of 425 μm. Then, the physical property evaluation of the polyethylene powder was carried out. The results of evaluating the polyethylene powder are shown in Table 2.

In the following Tables 1 and 2, "−" means being unevaluable because no membrane was obtained.

TABLE 1

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Catalytic activity in polymerization tank of first stage (g-PE/g-catalyst) | 20130 | 10981 | 25044 | 4264 | 18678 | 20041 | 12204 | 11468 | 15808 | 7165 | 4367 |
| Catalytic activity in polymerization tank of second stage (g-PE/g-catalyst) | — | — | — | — | 6779 | — | 12175 | — | 10585 | — | — |
| Intrinsic viscosity (IV) (dL/g) | 15.5 | 2.4 | 6.5 | 6.8 | 7.1 | 14.2 | 16.5 | 18.0 | 22.3 | 27.5 | 31.0 |
| Elastic limit strain ratio $\gamma_0\gamma_1$ (—) | 0.86 | 0.81 | 0.91 | 0.88 | 0.84 | 0.88 | 0.89 | 0.86 | 0.88 | 0.94 | 0.91 |
| Elastic limit strain $\gamma_1$ (—) | 0.28 | 0.96 | 0.73 | 0.61 | 0.71 | 0.58 | 0.49 | 0.35 | 0.20 | 0.14 | 0.12 |

TABLE 1-continued

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Value of pore size at peak of 10 μm or larger in pore size distribution (μm) | 50 | 65 | 84 | 40 | 97 | 41 | 53 | 48 | 36 | 64 | 46 |
| Ethylene homopolymer (content of α-olefin) | ○ | ○ | ○ | ○ | X | ○ | X | ○ | X | ○ | ○ |
| Isothermal crystallization time at 125° C. (min) | 2.0 | 4.5 | 3.4 | 4.1 | 5.5 | 3.1 | 6.1 | 1.1 | 6.5 | 8.1 | 5.4 |
| Apparent density (g/mL) | 0.45 | 0.36 | 0.45 | 0.35 | 0.48 | 0.41 | 0.44 | 0.48 | 0.41 | 0.41 | 0.42 |
| Average particle size D50 (μm) | 90 | 105 | 115 | 65 | 78 | 100 | 94 | 95 | 104 | 71 | 61 |
| Lamellar thickness (nm) | 20 | 15 | 14 | 16 | 17 | 14 | 19 | 16 | 14 | 19 | 18 |
| Appearance and shape evaluation of molded article | ◎ | ○ | ◎ | ◎ | ○ | ◎ | ◎ | ◎ | ◎ | ◎ | ◎ |
| Swellability evaluation | ◎ | ○ | ◎ | ◎ | ○ | ◎ | ◎ | ◎ | ◎ | ○ | ○ |
| Surface smoothness evaluation of molded article by high-speed molding | ◎ | Δ | ◎ | ◎ | ○ | ◎ | ◎ | ◎ | ◎ | Δ | Δ |

TABLE 2

| | Comparative Example 1 | Comparative Example 2 | Comparative Example 3 | Comparative Example 4 |
|---|---|---|---|---|
| Catalytic activity in polymerization tank of first stage (g-PE/g-catalyst) | 6757 | 8755 | 4413 | 4122 |
| Catalytic activity in polymerization tank of second stage (g-PE/g-catalyst) | — | 8861 | — | — |
| Intrinsic viscosity (IV) (dL/g) | 35.5 | 1.2 | 18.0 | 27.0 |
| Elastic limit strain ratio $\gamma_0/\gamma_1$ (—) | 0.97 | 0.98 | 0.68 | 1.05 |
| Elastic limit strain $\gamma_1$ (—) | 0.08 | 1.10 | 1.04 | 0.10 |
| Value of pore size at peak of 10 μm or larger in pore size distribution (μm) | 75 | 47 | 88 | 97 |
| Ethylene homopolymer (content of α-olefin) | ○ | ○ | ○ | ○ |
| Isothermal crystallization time at 125° C. (min) | 9.0 | 10 or more | 1.3 | 1.1 |
| Apparent density (g/mL) | 0.42 | 0.45 | 0.36 | 0.36 |
| Average particle size D50 (μm) | 72 | 80 | 68 | 63 |
| Lamellar thickness (nm) | 14 | 14 | 19 | 18 |
| Appearance and shape evaluation of molded article | Δ | — | Δ | X |
| Swellability evaluation | X | — | X | X |
| Surface smoothness evaluation of molded article by high-speed molding | X | — | X | Δ |

The polyethylene powder of the present invention has industrial applicability as a material for various molded articles, microporous membranes, separators for batteries, high-strength fiber, and the like.

The invention claimed is:

1. A polyethylene powder satisfying the following requirement 1 and requirement 2:

requirement 1: an intrinsic viscosity (IV) measured in accordance with IS01628-3 (2010) is 1.5 dL/g or more and 34.0 dL/g or less, and requirement 2: a ratio $\gamma_0/\gamma_1$ of an elastic limit strain $\gamma_0$ at a swelling time t (h) of 0 hours to an elastic limit strain $\gamma_1$ at a swelling time t (h) of 1 hour is 0.80 or more and 0.95 or less, wherein the ratio is obtained from a strain dependence test for dynamic viscoelasticity under the following Conditions for measurement of viscoelasticity of slurry and the swelling time t (h) is as defined below:

Conditions for measurement of viscoelasticity of slurry

Measurement apparatus: MARSIII manufactured by Thermo Fisher Scientific, Inc.

Stage: 20 mmφ

Plate: 20 mmφ parallel plate

Gap: 0.5 mm

Slurry composition: 30 parts by mass of the polyethylene powder and 70 parts by mass of liquid paraffin Conditions for measurement: the strain dependence test is conducted by the following steps 1 and 2:

step 1 of keeping a temperature of a slurry at 100° C. for the swelling time t (h) in a nitrogen atmosphere on a sample stage; and step 2 of conducting the strain dependence test under conditions of 180° C. and a frequency of 1 Hz in a nitrogen atmosphere, Determination of elastic limit strain: an elastic limit strain $\gamma_t$ is determined by a two-tangent method.

2. The polyethylene powder according to claim 1, wherein the elastic limit strain $\gamma_1$ at the swelling time t (h) of 1 hour obtained from the strain dependence test for dynamic viscoelasticity under the Conditions for measurement of viscoelasticity of slurry conditions is 0.10 or more.

3. The polyethylene powder according to claim 1, wherein the polyethylene powder has at least one peak within a range from 10 μm to 80 μm in a pore size distribution measured with a mercury porosimeter.

4. The polyethylene powder according to claim 1, wherein the polyethylene powder is an ethylene homopolymer.

5. The polyethylene powder according to claim 1, wherein an isothermal crystallization time at 125° C. is 7.0 minutes or shorter, as determined by measurement of isothermal crystallization time using DSC under the following Conditions for measurement of isothermal crystallization time:

Conditions for measurement for isothermal crystallization time step 1: retaining the polyethylene powder at 50° C. for 1 minute, followed by heating to 180° C. at a heating rate of 10° C./min;

step 2: retaining the polyethylene powder at 180° C. for 5 minutes, followed by cooling to 125° C. at a cooling rate of 80° C./min; and step 3: retaining the polyethylene powder at 125° C., wherein a time when a temperature reaches 125° C. is defined as the point of origin (0 min), and a time when an exothermic peak top assigned to crystallization is exhibited is regarded as the isothermal crystallization time.

6. The polyethylene powder according to claim 1, wherein an apparent density is 0.30 g/mL or larger.

7. The polyethylene powder according to claim 1, wherein a particle size $D_{50}$ determined by a dry sieving method is 150 μm or smaller.

8. The polyethylene powder according to claim 1, wherein a lamellar thickness is 30 nm or smaller.

9. A molded article of a polyethylene powder according to claim 1.

10. The molded article according to claim 9, wherein the molded article is a separator for secondary batteries.

11. The molded article according to claim 9, wherein the molded article is a separator for lithium ion secondary batteries.

12. The molded article according to claim 9, wherein the molded article is fiber.

* * * * *